(No Model.)
I. F. BASSFORD.
MOWING MACHINE CUTTER BAR.
No. 493,054. Patented Mar. 7, 1893.
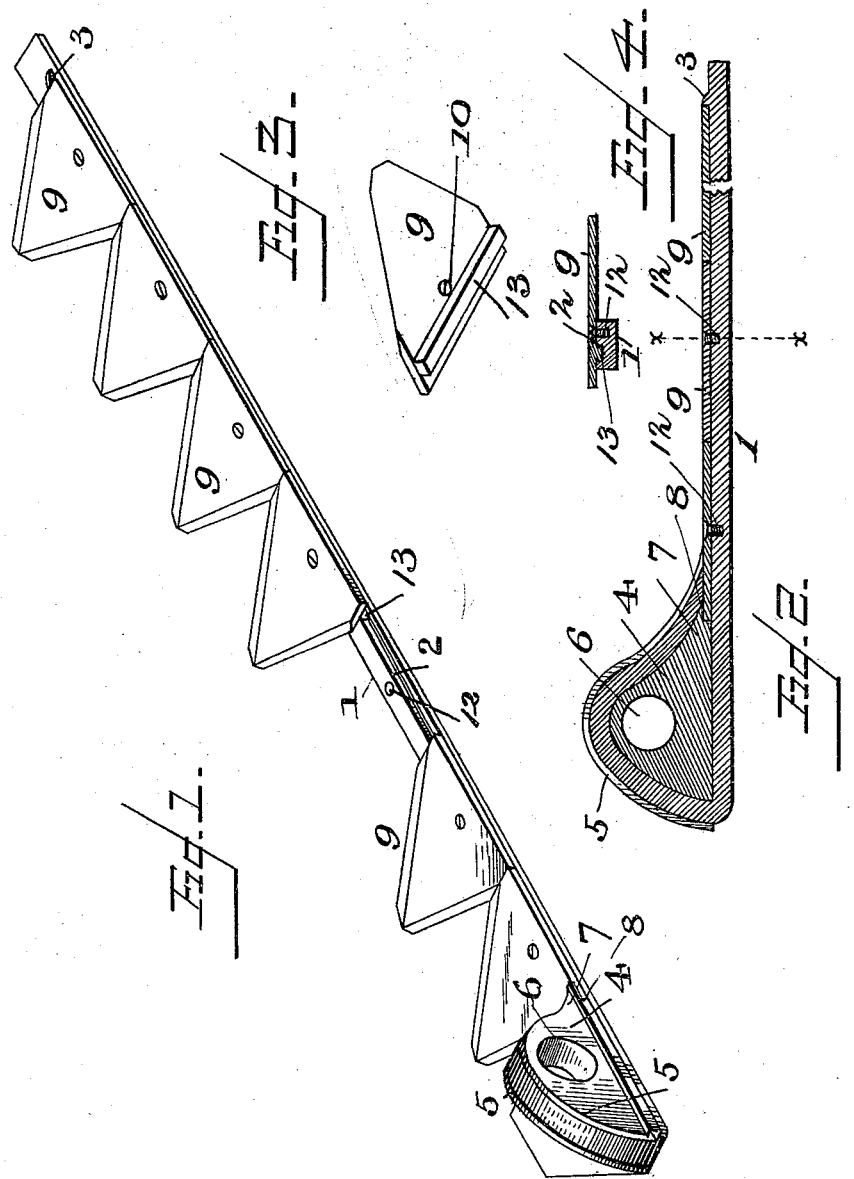
WITNESSES:
F. L. Ourand
W. L. Coombs
INVENTOR:
Isaac F. Bassford,
by Laus Dagger & Co.
Attorneys.
THE NORRIS PETERS CO., PHOTO-LITHO., WASHINGTON, D. C.

UNITED STATES PATENT OFFICE.

ISAAC FRANKLIN BASSFORD, OF MILWAUKEE, WISCONSIN, ASSIGNOR OF ONE-HALF TO ADOLPH DOCTER, OF SAME PLACE.

MOWING-MACHINE CUTTER-BAR.

SPECIFICATION forming part of Letters Patent No. 493,054, dated March 7, 1893.

Application filed October 3, 1892. Serial No. 447,650. (No model.)

*To all whom it may concern:*

Be it known that I, ISAAC FRANKLIN BASSFORD, a citizen of the United States, and a resident of Milwaukee, in the county of Milwaukee and State of Wisconsin, have invented certain new and useful Improvements in Mowing-Machine Cutter-Bars; and I do hereby declare that the following is a full, clear, and exact description of the invention, which will enable others skilled in the art to which it appertains to make and use the same, reference being had to the accompanying drawings, which form a part of this specification.

My invention relates to improvements in cutter-bars for mowing machines, and its object is to improve the manner of securing the cutter blades to the cutter bar, whereby the blades may be rigidly held in place, while, at the same time, they can be easily removed and replaced when desired.

The invention consists in the novel construction and combination of parts, hereinafter fully described and claimed.

In the accompanying drawings: Figure 1 is a perspective view of a mowing-machine cutter-bar, constructed in accordance with my invention. Fig. 2 is a detail sectional view of the inner end of the cutter-bar. Fig. 3 is a perspective view, looking from the underside of one of the blades, detached from the cutter-bar; and Fig. 4 is a section on the line x—x, Fig. 2.

Like numerals of reference designate corresponding parts in all the figures.

In the said drawings, the reference numeral 1 designates the cutter-bar, formed with a horizontal rectangular groove 2, extending nearly from end to end thereof. This bar, near its outer end, is formed with a lug 3, against which the outermost blades abut when said blades are secured to the bar, as shown in Fig. 1.

At the inner end of the cutter bar is a block 4, having its upper side rounded or curved and formed with two parallel flanges 5, 5, forming a groove to receive the end of the cutter-bar which is bent over, as shown, so as to hold the block securely in place. The block is provided with an eye 6, with which the pitman engages, and a lateral extension 7, and has its outer end cut away at 8, forming a space to receive the edge of the innermost cutter-blade.

The numeral 9 denotes the cutter-blades, each of which is provided with an aperture 10, registering with a screw-threaded aperture 12 in the cutter-bar when the blades are in place. Each blade on its underside is provided with a rectangular rib 13, adapted to seat in the groove in the cutter-bar.

The manner of using the invention is as follows: The blades are applied to the bar with their ribs resting in the groove, and screws are then inserted in the apertures 10 and 12 by which the blades are securely held in place.

Having thus described my invention, what I claim is—

The combination with a cutter-bar having a horizontal rectangular groove, a series of screw-threaded apertures, a lug near its outer end, and the blades having apertures therein, and rectangular ribs upon their undersides, of the curved block having an eye, the extension, the cut-away portion and the flanges forming a groove to receive the bent over end of the cutter-bar, substantially as described.

In testimony that I claim the foregoing as my own I have hereunto affixed my signature in presence of two witnesses.

ISAAC FRANKLIN BASSFORD.

Witnesses:
CHAS. TRZEBIATOWSKI,
W. J. NICHOLSON.